United States Patent
Xu et al.

(10) Patent No.: US 11,062,072 B1
(45) Date of Patent: Jul. 13, 2021

(54) YIELD LOAD PULL SYSTEM-BASED IC DESIGN METHOD AND SYSTEM THEREOF

(71) Applicant: University of Electronic Science and Technology of China, Sichuan (CN)

(72) Inventors: Yuehang Xu, Sichuan (CN); Shuman Mao, Sichuan (CN); Yunqiu Wu, Sichuan (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 16/912,006

(22) Filed: Jun. 25, 2020

(30) Foreign Application Priority Data

Mar. 24, 2020 (CN) .......................... 202010211261.3

(51) Int. Cl.
| | | |
|---|---|---|
| *G06F 30/30* | (2020.01) | |
| *G06F 30/367* | (2020.01) | |
| *G06F 30/373* | (2020.01) | |
| *G06F 119/22* | (2020.01) | |
| *G06F 119/06* | (2020.01) | |

(52) U.S. Cl.
CPC .......... *G06F 30/367* (2020.01); *G06F 30/373* (2020.01); *G06F 2119/06* (2020.01); *G06F 2119/22* (2020.01)

(58) Field of Classification Search
CPC .............................. G06F 30/373; G06F 30/367
USPC ........................................ 716/100, 109, 132
See application file for complete search history.

(56) References Cited

U.S. PATENT DOCUMENTS

| | | | | |
|---|---|---|---|---|
| 6,639,393 B2 * | 10/2003 | Tasker et al. | .......... | G01R 27/28 324/606 |
| 6,674,293 B1 * | 1/2004 | Tsironis | .................... | H01P 5/04 324/637 |
| 6,772,400 B2 * | 8/2004 | Tsai | ...................... | G06F 30/367 703/14 |
| 7,486,067 B2 * | 2/2009 | Bossche | ................. | G01R 27/28 324/76.22 |
| 7,665,048 B2 * | 2/2010 | Chan et al. | ........... | G06F 30/398 716/132 |
| 7,979,832 B2 * | 7/2011 | Jung et al. | .............. | G06F 30/30 716/134 |
| 9,213,056 B1 * | 12/2015 | Tsironis | ............... | G01R 1/0491 |

(Continued)

*Primary Examiner* — Sun J Lin
(74) *Attorney, Agent, or Firm* — M&B IP Analysts, LLC

(57) ABSTRACT

A yield load pull system-based integrated circuit design method and a system thereof are provided. The method includes: setting a yield-related threshold; setting a source impedance; configuring a sweep range of a Smith chart; determining load impedance points within the sweep range of the Smith chart; acquiring impedance information; determining output characteristics of a plurality of sample devices at each load impedance point of the determined load impedance points, based on the source impedance and the impedance information corresponding to each load impedance point, by invoking a harmonic balance simulator embedded in an Advanced Design System, where the output characteristics comprise: a large-signal gain, an output power and a power-added efficiency; determining a device yield for each load impedance point; for each output characteristic calculating a mean value across the plurality of sample devices, at each load impedance point; and determining a best load impedance; conducting IC design.

10 Claims, 8 Drawing Sheets

(56) References Cited

U.S. PATENT DOCUMENTS

| | | | |
|---|---|---|---|
| 9,275,986 B2* | 3/2016 | Bakalski | H01L 27/0629 |
| 9,459,336 B1* | 10/2016 | Tsironis | G01R 31/2822 |
| 10,762,166 B1* | 9/2020 | Winston et al. | G06F 30/367 |

* cited by examiner

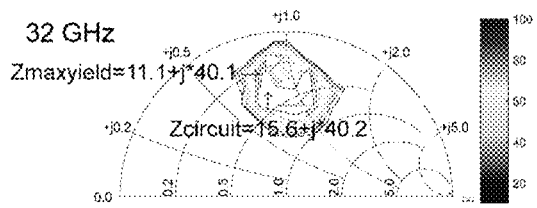
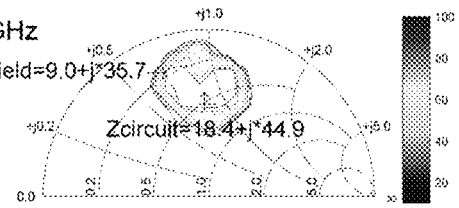
FIG. 8(a)　　　　　　FIG. 8 (b)
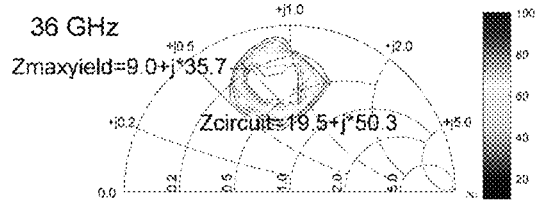
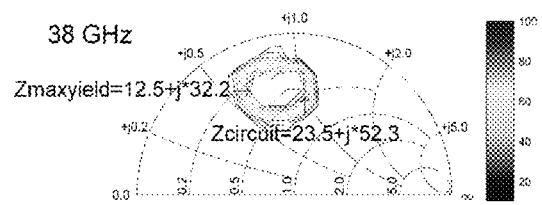
FIG. 8 (c)　　　　　　FIG. 8 (d)
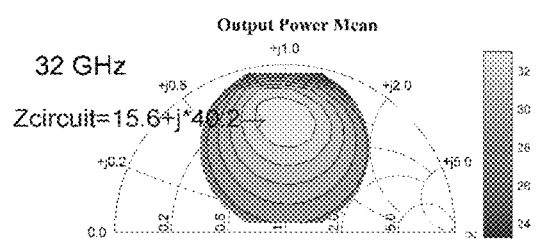
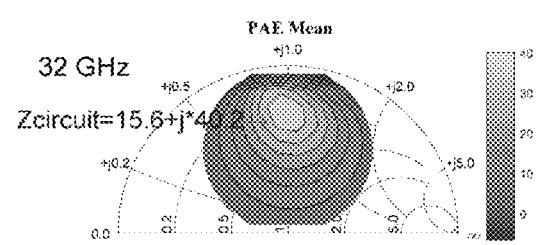
FIG. 9(a)　　　　　　FIG. 9 (b)
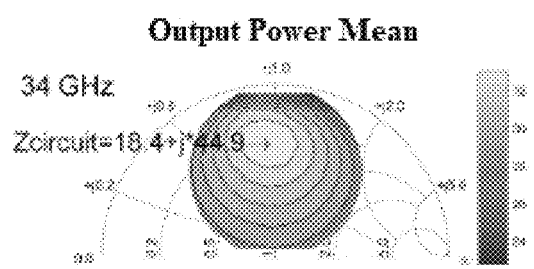
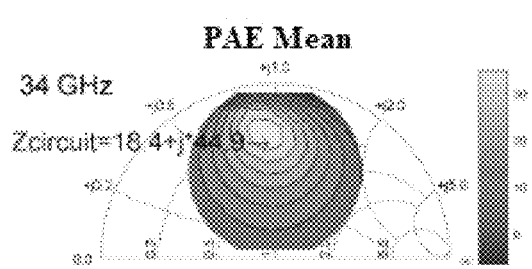
FIG. 9 (c)　　　　　　FIG. 9 (d)
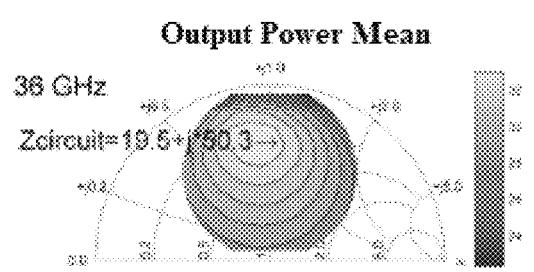
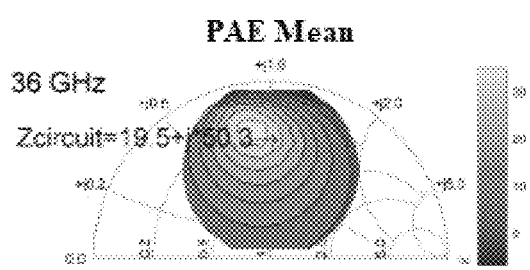
FIG. 9 (e)　　　　　　FIG. 9 (f)

YIELD LOAD PULL SYSTEM-BASED IC DESIGN METHOD AND SYSTEM THEREOF

CROSS-REFERENCE TO RELATED APPLICATIONS

This application claims priority under 35 USC 119 from Chinese Application No. 202010211261.3 CN, filed Mar. 24, 2020, now pending, the entirety of which is incorporated by reference herein.

TECHNICAL FIELD

The present disclosure relates to the technical field of IC (Integrated circuit) design and fabrication, and in particular to a yield load pull system-based IC design method and a system thereof.

BACKGROUND

Due to the limitations of fabrication equipment and manufacturing techniques, errors of process parameters and defects in materials are inevitable. This can cause fluctuations in DC or RF output characteristics of the device, affecting the consistency in device performance and severely reducing the yield of integrated circuits.

In order to overcome this drawback, IC design usually employs an iterative approach to improve yield based on engineering experience, which however is fundamentally arbitrary and may significantly increase circuit design cost.

SUMMARY

An object of the present disclosure is to provide a yield load pull system-based IC design method and a system thereof, which can reduce the arbitrariness in circuit tuning and optimization and reduce IC design and fabrication cost.

To achieve the object above, the present disclosure provides a technical solution as follows:

A yield load pull system-based IC design method, including:

setting a yield-related threshold, the yield-related threshold comprising a large-signal gain threshold, an output power threshold and a power-added efficiency threshold;

setting a source impedance;

configuring a Smith chart sweep range corresponding to load impedance;

determining load impedance points within the Smith chart sweep range;

acquiring impedance information corresponding to each load impedance point;

determining output characteristics of a plurality of sample devices at each load impedance point, based on the source impedance and the impedance information corresponding to each load impedance point, by invoking a harmonic balance simulator embedded in ADS, where the output characteristics comprise: large-signal gain, output power and power-added efficiency;

determining a device yield for each load impedance point, according to a criterion that considers sample devices whose output characteristics meet the yield-related threshold passing;

for each output characteristic calculating a mean value across the plurality of sample devices, at each load impedance point;

determining a best load impedance according to the device yields of respective load impedance points and the output characteristic means at respective load impedance points;

conducting IC design according to the best load impedance.

Optionally, the large-signal gain threshold is a range [MinGain, MaxGain] where MaxGain is a maximum gain threshold and MinGain is a minimum gain threshold.

Optionally, the output power threshold is a minimum output power threshold.

Optionally, the power-added efficiency threshold is a minimum power-added efficiency threshold.

Optionally, the determining output characteristics of a plurality of sample devices at each load impedance point based on the source impedance and the impedance information corresponding to each load impedance point by invoking a harmonic balance simulator embedded in ADS includes:

inputting the source impedance and the impedance information corresponding to each load impedance point to a harmonic balance simulator embedded in ADS, to obtain RF current and voltage of each sample device at a fundamental frequency at each load impedance point; and calculating output characteristics of the sample device at each load impedance point according to the RF current and voltage.

Optionally, the determining a device yield for each load impedance point according to a criterion that considers sample devices whose output characteristics meet the yield-related threshold passing includes:

of the plurality of sample devices, determining those that meet all of the large-signal gain threshold, output power threshold and power-added efficiency threshold passing;

calculating the number of passing sample devices at each load impedance point;

calculating a device yield for each load impedance point according to the number of passing sample devices at each load impedance point.

Optionally, the determining a best load impedance according to the device yields of respective load impedance points and the mean output characteristics at respective load impedance points includes:

correlating the yield at each load impedance point with the position of the load impedance point in the Smith chart, and acquiring yield-impedance characteristic contours;

correlating mean output power at each load impedance point with the position of the load impedance point in the Smith chart, and acquiring mean output power impedance characteristic contours;

correlating mean power-added efficiency at each load impedance point with the position of the load impedance point in the Smith chart, and acquiring mean power-added efficiency impedance characteristic contours;

determining a best load impedance, according to the yield-impedance characteristic contours, mean output power impedance characteristic contours and mean power-added efficiency impedance characteristic contours.

The present disclosure also provides a yield load pull system-based IC design system, including:

a yield-related threshold setting module, configured to set a yield-related threshold, the yield-related threshold comprising a large-signal gain threshold, an output power threshold and a power-added efficiency threshold;

a source impedance setting module, configured to set a source impedance;

a sweep range configuring module, configured to configure a Smith chart sweep range corresponding to load impedance;

a load impedance point determination module, configured to determine load impedance points within the Smith chart sweep range;

a load impedance information acquisition module, configured to acquire impedance information corresponding to each load impedance point;

an output characteristic determination module, configured to determine output characteristics of a plurality of sample devices at each load impedance point, based on the source impedance and the impedance information corresponding to each load impedance point, by invoking a harmonic balance simulator embedded in ADS, where the output characteristics comprise: large-signal gain, output power and power-added efficiency;

an impedance point yield determination module, configured to determine a device yield for each load impedance point, according to a criterion that considers sample devices whose output characteristics meet the yield-related threshold passing;

an output characteristic mean calculation module, configured to calculate, for each output characteristic, a mean value across the plurality of sample devices, at each load impedance point;

a best load impedance determination module, configured to determine a best load impedance according to the device yields of respective load impedance points and the mean output characteristics at respective load impedance points;

an IC design module, configured to conduct IC design according to the best load impedance.

Optionally, the output characteristic determination module includes:

a simulation unit, configured to input the source impedance and the impedance information corresponding to each load impedance point and specified simulation conditions to a harmonic balance simulator embedded in ADS, to obtain RF current and voltage of each sample device at a fundamental frequency at each load impedance point;

an output characteristic calculation unit, configured to calculate output characteristics of the sample device at each load impedance point according to the RF current and voltage.

Optionally, the best load impedance determination module includes:

a yield-impedance characteristic contours determination unit, configured to correlate the yield at each load impedance point with the position of the load impedance point in the Smith chart, and acquire yield-impedance characteristic contours;

a mean output power impedance characteristic contours determination unit, configured to correlate mean output power at each load impedance point with the position of the load impedance point in the Smith chart, and acquire mean output power impedance characteristic contours;

a mean power-added efficiency-impedance characteristic contours determination unit, configured to correlate mean power-added efficiency at each load impedance point with the position of the load impedance point in the Smith chart, and acquire mean power-added efficiency impedance characteristic contours;

a best load impedance determination unit, configured to determine a best load impedance, according to the yield-impedance characteristic contours, the mean output power impedance characteristic contours and mean power-added efficiency impedance characteristic contours.

According to the embodiments of the present disclosure, the present disclosure can bring the following technical affects: The yield load pull system-based IC design method and system of the present disclosure correlate IC impedance characteristic with yield characteristic by using yield as an indicator, and avoid the iterative, mechanical approach in solving the convergence problem; the arbitrariness in circuit tuning and optimization is reduced, and design cycle time and cost are reduced. In addition, the present disclosure takes into account both device yield and device output characteristics. Therefore, by yield optimization according to this method, designers can ensure output performance while maintaining a high yield of IC design.

BRIEF DESCRIPTION OF THE DRAWINGS

To more clearly illustrate the technical solutions of the embodiments of the present disclosure and in the prior art, accompanying drawings used in the description are briefly described below. It will be apparent to those skilled in the art that the drawings described herein are merely some of the disclosed embodiments and that other figures can be obtained from these drawings without inventive effort.

FIG. 2 (b) illustrates a standard threshold for output power according to an embodiment of the present disclosure; FIG. 2 (c) illustrates a standard threshold for power-added efficiency according to an embodiment of the present disclosure;

FIG. 8 (a), FIG. 8 (b), FIG. 8 (c) and FIG. 8 (d) illustrate yield-load characteristic contours at 32 GHz, 34 GHz, 36 GHz and 38 GHz according to an embodiment of the present disclosure;

FIG. 9 (b), FIG. 9 (d), FIG. 9 (f) and FIG. 9 (h) illustrate mean power-added efficiency impedance characteristic contours at 32 GHz, 34 GHz, 36 GHz and 38 GHz according to an embodiment of the present disclosure;

DETAILED DESCRIPTION OF PARTICULAR EMBODIMENTS

The technical solutions of the embodiments of the present disclosure will be described clearly and fully in conjunction with the accompanying drawings. As a matter of course, the embodiments described herein are only some of the disclosed embodiments. Those skilled in the art can obtain other embodiments from these embodiments without inventive effort; those other embodiments shall fall within the scope of the disclosed embodiments.

For a better understanding of the object, features and advantages of the present disclosure, embodiments of the present disclosure will be described below with reference to the accompanying drawings.

Figure 1:
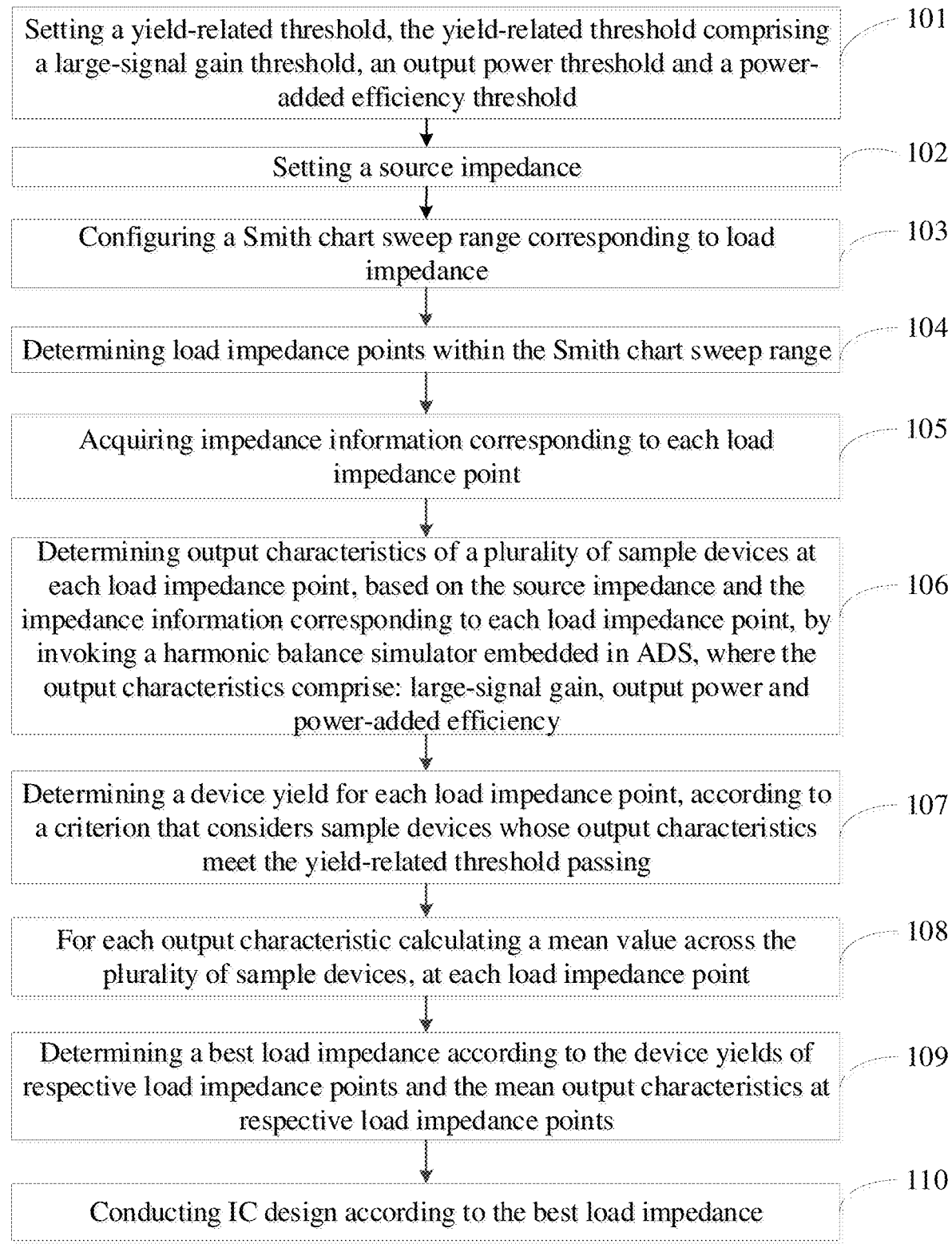
FIG. 1 is a flowchart of a yield load pull system-based IC design method according to an embodiment of the present disclosure.

According to one aspect of the present disclosure, a yield load pull system-based IC design method is provided. As shown in FIG. 1, the method includes the following steps:

Step 101: setting a yield-related threshold, the yield-related threshold comprising a large-signal gain threshold, an output power threshold and a power-added efficiency threshold;

Step 102: setting a source impedance;

Step 103: configuring a Smith chart sweep range corresponding to load impedance;

Step 104: determining load impedance points within the Smith chart sweep range;

Step 105: acquiring impedance information corresponding to each load impedance point;

Step 106: determining output characteristics of a plurality of sample devices at each load impedance point, based on the source impedance and the impedance information corresponding to each load impedance point, by invoking a harmonic balance simulator embedded in ADS, where the output characteristics comprise: large-signal gain, output power and power-added efficiency;

Step 107: determining a device yield for each load impedance point, according to a criterion that considers sample devices whose output characteristics meet the yield-related threshold passing;

Step 108: for each output characteristic calculating a mean value across the plurality of sample devices, at each load impedance point;

Step 109: determining a best load impedance according to the device yields of respective load impedance points and the mean output characteristics at respective load impedance points;

Step 110: conducting IC design according to the best load impedance.

In an embodiment, the yield-related threshold in step 101 is a standard threshold of a device or IC output characteristic. Upon setting in advance a standard threshold of a device or IC output characteristic, circuit or device design engineers can count device samples whose output characteristics are within the standard threshold, thereby obtaining the yield of the sample set. Because the present disclosure is primarily directed at large-signal output characteristics at microwave or millimeter wave frequencies, the output characteristics in the method may include output power (Pout), large-signal gain (Gain) and power-added efficiency (PAE). Thresholds corresponding to the output characteristics can be set according to criteria as shown in FIG. 2.

Figure 2A:
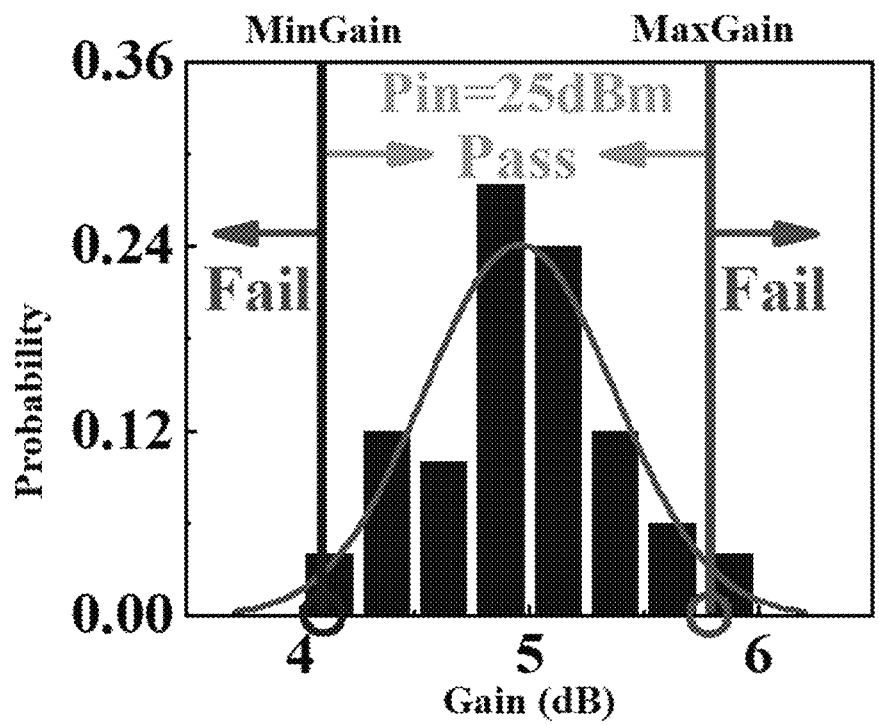
FIG. 2 (a) illustrates a standard threshold for large-signal gain according to an embodiment of the present disclosure.
Figure 2B:
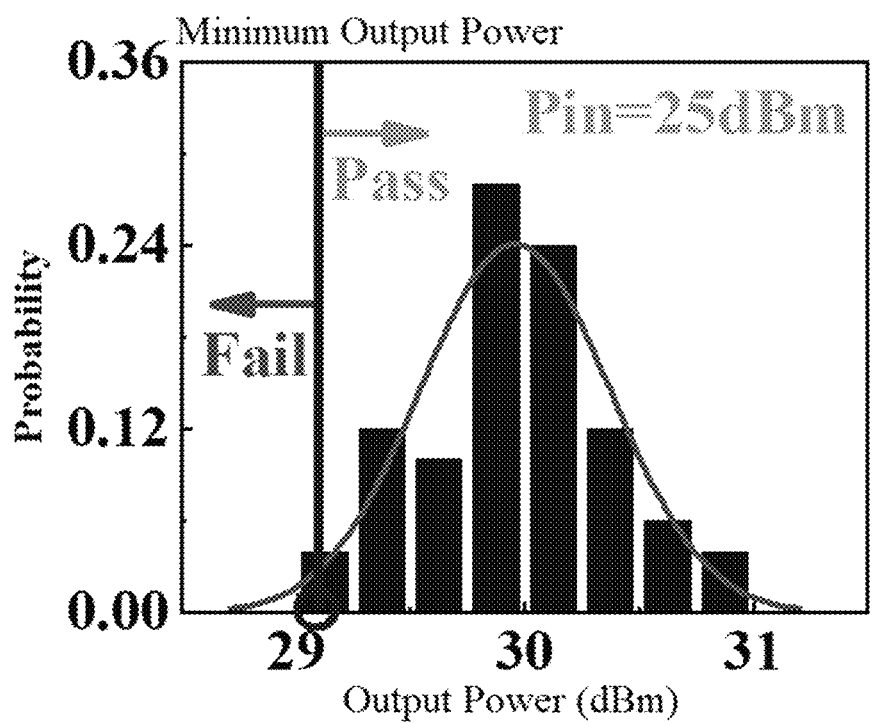
Figure 2C:
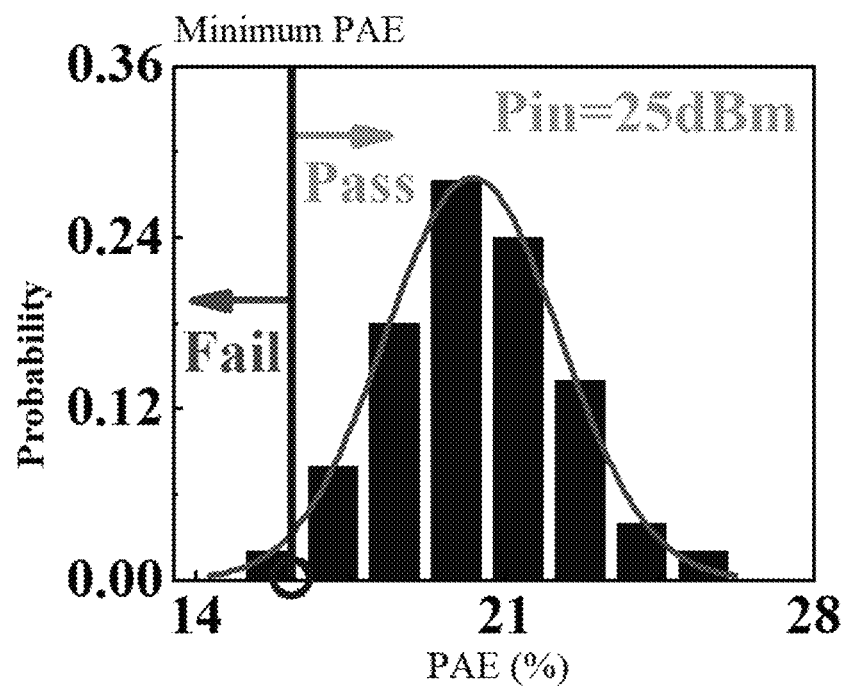

As shown in FIG. 2, in a practical application, with respect to large-signal gain (Gain), a flatness measure can be used, with a maximum gain threshold (MaxGain) and a minimum gain threshold (MinGain). Samples that fall within the range (MinGain<Gain<MaxGain) are considered passing, and those that do not are considered failed. With respect to output power (Pout) and power-added efficiency (PAE), a minimum output power threshold (MinPout) and a minimum power-added efficiency threshold (MinPAE) can be used respectively. Samples that fall within the ranges (MinPout<Pout, and MinPAE<PAE) are considered passing, and those that do not are considered failed.

Figure 3:
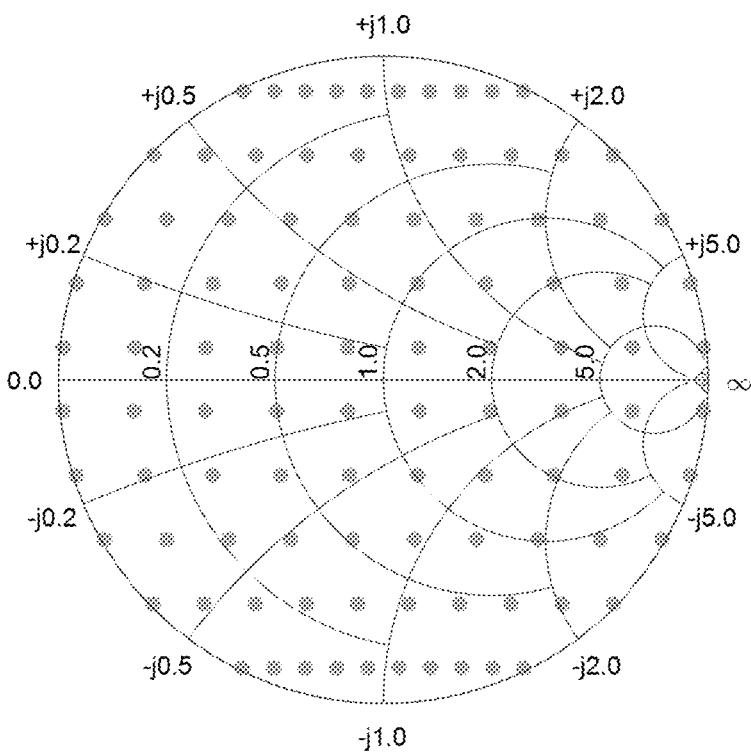
FIG. 3 is a diagram illustrating a Smith chart sweep range corresponding to load impedance according to an embodiment of the present disclosure.

In an embodiment, parameters for configuring the Smith chart sweep range in step 103 mainly include: Cartesian coordinates of the center of the sweep range, radius of the sweep range, and number of points covered by the sweep range. In the embodiment, in step 104, a load pull system rounds up the square root of the number of points specified by a user, and configures a Smith chart sweep range that covers the same numbers of points in the x-axis and y-axis directions (Cartesian), with points evenly distributed in each direction. In addition, the load pull system may be fault-tolerant with respect to parameters entered by the user. For example, if the sweep range specified by the user falls partially out of the Smith chart, the system automatically decreases the radius while maintaining the position of the center so that the resulting sweep range falls within the Smith chart; if the center specified by the user falls outside the Smith chart, the system alerts and asks the user to re-specify a center for the sweep range. FIG. 3 is an impedance point distribution chart automatically generated by the system for a particular sweep range (center: x=0, y=0; radius: 0.99; number of points: 100).

In an embodiment, step 105 may include: inputting the source impedance and the impedance information corresponding to each load impedance point to a harmonic balance simulator embedded in ADS, to obtain RF current and voltage of each sample device at a fundamental frequency at each load impedance point; and calculating output characteristics of the sample device at each load impedance point according to the RF current and voltage.

In order for a harmonic balance (HB) simulator embedded in ADS (Advanced Design System) from Keysight Technologies to calculate RF large-signal output characteristics at each load impedance point in FIG. 3, the impedance information corresponding to each load impedance point in FIG. 3 may be recorded by MATLAB, to generate a text file in measurement data format (MDF) along with a header file for MDF so that the text file is readable and invokable from a Data Access Component (DAC) in ADS.

In the load pull system, the harmonic balance simulation may be realized by three modules working together, an ADS simulator connection module, a netlist file modification module and a simulation result extraction module. The ADS simulator connection module realizes communication between MATLAB and ADS; after MATLAB completes netlist file modification, the ADS simulator connection module is used to invoke an ADS simulator for simulation, acquire a simulation result and transmit the simulation result to the simulation result extraction module.

The ADS simulator connection module may, by MATLAB executing an external BAT file, build an ADS simulation environment, connect hpeeSofsim simulator paths and specify result output format. The netlist file modification module may, based on a customized power sweep simulation template, output a corresponding netlist file netlist.log (The netlist file is generated based on an existing ADS schematic and can subsequently be modified by MATLAB to realize simulation of different suites), and edit the text of the netlist file by MATLAB to update or replace original simulation conditions. The simulation conditions include: frequency (Freq), source and load impedances (Zs and Zl), gate and drain biases (Vgs and Vds), input power (Pin), and simulation order (Order). The frequency (Freq), gate and drain biases (Vgs and Vds), input power (Pin), source impedance (Zs) and simulation order are all provided with a user interface and accessible to the user; the user can specify according to actual needs (circuit design needs). The load impedance (Zl) is determined by the impedance information corresponding to each point in FIG. 3. The simulation result extraction module may conduct text data analysis by MATLAB on the simulation result, to acquire RF current and voltage data at a fundamental frequency under a certain input power. A large-signal gain, an output power (Pout), and a power-added efficiency (PAE) can be calculated according to the equation below and the data is stored.

$$Pout = 0.5 * \text{red}(V_{load}[1] * \text{conj}(I_{load}[1])) \quad (1)$$

$$Gain = Pout - Pin \quad (2)$$

$$PAE = \frac{Pout - Pin}{PDC} \times 100\% \quad (3)$$

where $V_{load}[1]$ denotes a node voltage of the load at a fundamental frequency, which can be obtained from an ADS marker readout; $I_{load}[1]$ denotes an output current of the load at a fundamental frequency, which can be obtained from an ADS current meter; PDC denotes a DC static power consumption, which can be calculated according to $PDC = V_{gs} * I_{gs} + V_{ds} * I_{ds}$; $V_{gs}$ denotes a gate-source voltage, $V_{ds}$ denotes a drain-source voltage, $I_{gs}$ denotes a gate-source current, and $I_{ds}$ denotes a drain-source current.

Figure 4:
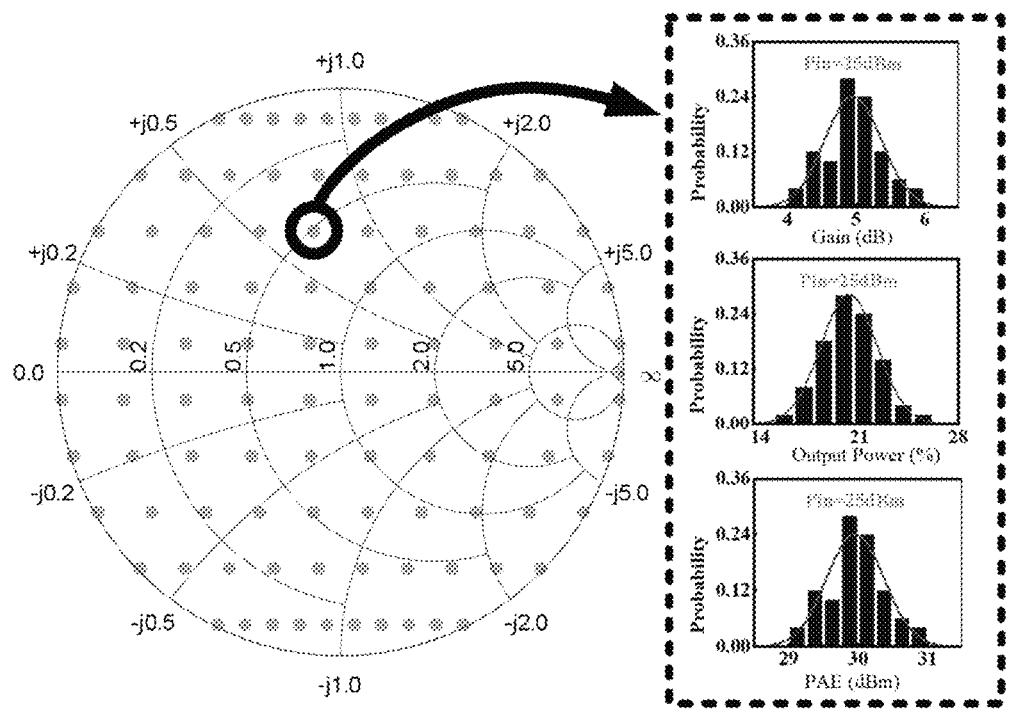
FIG. 4 illustrates output characteristic distributions at a given load impedance point according to an embodiment of the present disclosure.

Based on a quasi-physical large-signal statistical model proposed by Z Wen, S Mao, Y Wu, R Xu, B Yan, and Y Xu in their article "A Quasi-Physical Large-Signal Statistical Model for 0.15 μm AlGaN/GaN HEMTs Process," 2019 IEEE MTT-S International Microwave Symposium (IMS), Boston, Mass., USA, 2019, pp. 208-211", output characteristic distributions from a plurality of device samples at each load impedance point in FIG. 3 can be acquired by MATLAB invoking ADS to conduct a plurality of harmonic balance simulation processes. FIG. 4 shows output characteristic distributions corresponding to 50 device samples at a given source and load impedance point, which are acquired from 50 simulation processes based on the quasi-physical large-signal statistical model above.

In an embodiment, step 107 may include:

of the plurality of sample devices, determining those that meet all of the large-signal gain threshold, output power threshold and power-added efficiency threshold passing;

calculating the number of passing sample devices at each load impedance point; calculating a device yield for each load impedance point according to the number of passing sample devices at each load impedance point.

As shown in Table 1, if an output characteristic is within a threshold in step 101, it is marked with 1; otherwise, it is marked with 0.

In Table 1, Pout_c, Gain _c and PAE _c are truth values of the output power (Pout), large-signal gain (Gain) and power-added efficiency (PAE) indicators of a given device sample, respectively.

TABLE 1

Single Sample Output Characteristic Indicator Marking Criteria

| Pout Criterion | Pout > MinPout | Other |
|---|---|---|
| Pout_c | 1 | 0 |
| Gain Criterion | MinGain < Gain < MaxGain | Other |
| Gain_c | 1 | 0 |
| PAE Criterion | PAE > MinPAE | Other |
| PAE_c | 1 | 0 |

Based on the marking criteria for single sample output characteristic indicators shown Table 1, the output characteristics of all the device samples in the statistical model at a given impedance point shown in FIG. 4 can be marked, to obtain a truth table for the output characteristic indicators of different samples, e.g., Table 2. Because a single sample has to meet all of the output power threshold, large-signal gain threshold and power-added efficiency threshold in step 101 to be considered passing, a logical conjunction of Pout_c, Gain_c and PAE_c is calculated, i.e., Pout_c & Gain_c & PAE_c in the table below. If the result of Pout_c & Gain_c & PAE_c is 1, the sample is considered passing; otherwise, the sample is considered failed.

TABLE 2

Truth Table for All Sample Making Results at Given Impedance Point in FIG. 4

| Sample No. | 1 | 2 | 3 | 4 | 5 | 6 | ... | 48 | 49 | 50 |
|---|---|---|---|---|---|---|---|---|---|---|
| Pout_c | 1 | 1 | 0 | 0 | 1 | 0 | ... | 0 | 1 | 0 |
| Gain_c | 1 | 0 | 1 | 0 | 1 | 0 | ... | 1 | 1 | 0 |
| PAE_c | 1 | 1 | 0 | 1 | 0 | 1 | ... | 0 | 1 | 0 |
| Pout_c & Gain_c & PAE_c | 1 | 0 | 0 | 0 | 0 | 0 | ... | 0 | 1 | 0 |

Based on the truth table for all sample making results at a given impedance point as shown in Table 2, the samples that meet the Pout_c & Gain_c & PAE_c condition can be counted; and according to the count and the total number of samples, an output characteristic-based yield at the impedance point can be calculated according to the equation below:

$$Z_L\_Yield = \frac{\sum_{i}^{n}(Pout\_c_i \ \& \ Gain\_c_i \ \& \ PAE\_c_i)}{n} \times 100\% \quad (4)$$

where $Pout\_c_i$, $Gain\_c_i$ and $PAE\_c_i$ are results of an ith sample, and the total number of samples is n.

By repeating the calculation above for all load impedance points in FIG. 4, an output characteristic-based yield can be calculated for each impedance point.

Figure 5:
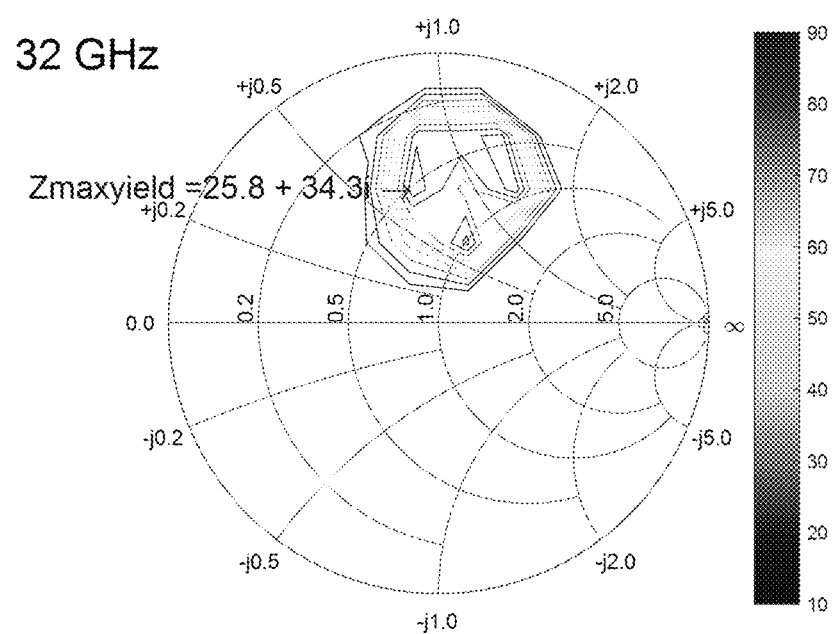
FIG. 5 illustrates yield-impedance characteristic contours according to an embodiment of the present disclosure.
Figure 6:
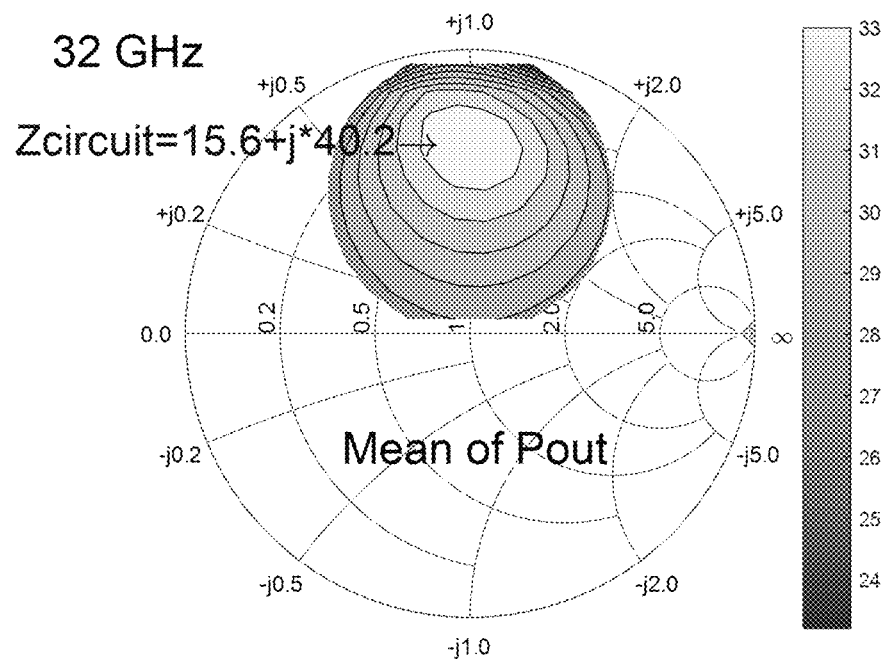
FIG. 6 illustrates mean output power impedance characteristic contours according to an embodiment of the present disclosure.
Figure 7:
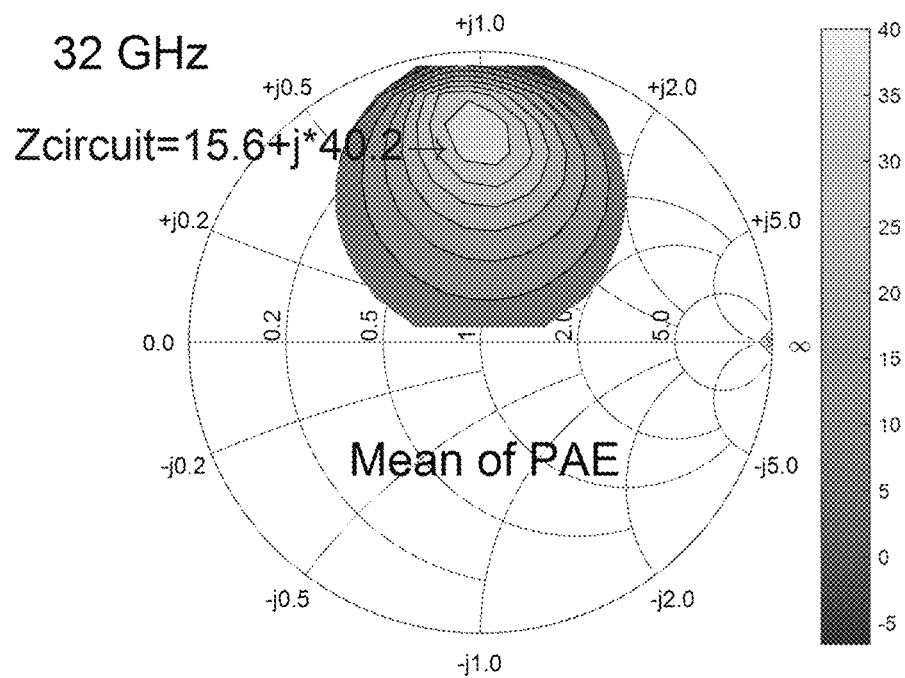
FIG. 7 illustrates acquiring mean power-added efficiency impedance characteristic contours according to an embodiment of the present disclosure.
Figure 9:
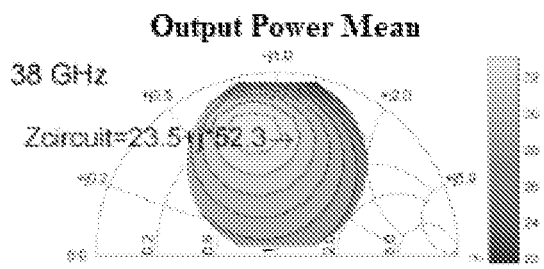
FIG. 9 (a), FIG. 9 (c), FIG. 9 (e) and FIG. 9 (g) illustrate mean output power impedance characteristic contours at 32 GHz, 34 GHz, 36 GHz and 38 GHz according to an embodiment of the present disclosure.
Figure 9:
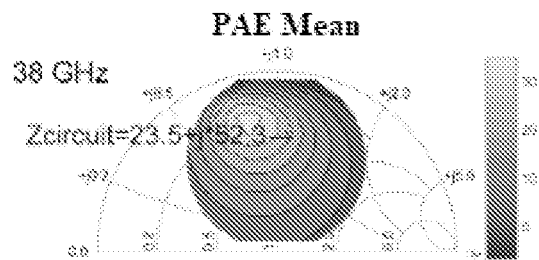

In an embodiment, step 109 may include:

correlating the yield at each load impedance point with the position of the load impedance point in the Smith chart, and acquiring yield-impedance characteristic contours in the whole Smith chart under a fixed frequency, bias and input power; an example is shown in FIG. 5. The central region in FIG. 5 is a high-yield region, and the region outside the contours corresponds to a yield of 0. A load impedance corresponding to the maximum yield is marked in FIG. 5.

correlating mean output power at each load impedance point with the position of the load impedance point in the Smith chart, and acquiring mean output power impedance characteristic contours, as shown in FIG. 6;

correlating mean power-added efficiency at each load impedance point with the position of the load impedance point in the Smith chart, and acquiring mean power-added efficiency impedance characteristic contours, as shown in FIG. 7;

determining a best load impedance, according to the yield-impedance characteristic contours, the mean output power impedance characteristic contours and the mean power-added efficiency impedance characteristic contours. For example, based on a statistical model for 4×50 μm chips proposed by Z Wen, S Mao, Y Wu, R Xu, B Yan, and Y Xu in their article "A Quasi-Physical Large-Signal Statistical Model for 0.15 μm AlGaN/GaN HEMTs Process," 2019 IEEE MTT-S International Microwave Symposium (IMS), Boston, Mass., USA, 2019, pp. 208-211", yield load pulls are performed at 32 GHz, 34 GHz, 36 GHz and 38 GHz frequency points, with biases $V_{gs}=-1.8$ V and $V_{ds}=24$ V and an input power Pin of 26 dBm, and yield-load characteristic contours corresponding to different frequency points are acquired, as shown in FIG. 8. In addition to the yield contours of all load impedance points shown in FIG. 8, mean output power impedance characteristic contours and mean power-added efficiency impedance characteristic contours at the four frequency points can be acquired, as shown in FIG. 9. Taking into account both the yield-impedance characteristic contours in FIG. 8 and the output characteristic mean contours in FIG. 9, and considering actual IC layout constraints, the load impedance point and corresponding yield and mean output characteristics at each frequency point can be determined, as shown in Table 3. As can be seen from a comparison between FIG. 8, FIG. 9 and Table 3, the selected load impedance point ensures RF output characteristics while maintaining a high yield.

TABLE 3

Load impedance point and Corresponding Yield and Mean Output Characteristic at Different Frequency Points

| Frequency | Load Impedance | Yield | Mean Pout | Mean PAE |
|---|---|---|---|---|
| 32 GHz | 15.6 + j * 40.2 Ω | 93% | 32.3 dBm | 33.2% |
| 34 GHz | 18.4 + j * 44.9 Ω | 86% | 32.5 dBm | 32.3% |
| 36 GHz | 19.5 + j * 50.3 Ω | 95% | 32.1 dBm | 29.8% |
| 38 GHz | 23.5 + j * 52.3 Ω | 84% | 31.6 dBm | 28.2% |

The IC design method according to the embodiment of the present disclosure is verified as follows.

This verification employs a 32-38 GHz 15 W GaN MMIC power amplifier. The power amplifier has a three-stage topology, due to output power and power gain requirements and large-signal characteristics of the 0.15 μm technique. The first stage includes four 4×50 μm GaN transistors, the second stage includes eight 4×50 μm GaN transistors, and the third stage includes sixteen 4×70 μm GaN transistors. Design requirements include: output power greater than 15 W, gain between 16-18 dB, and power-added efficiency greater than 25%.

Due to the decisive effect by final-stage transistors on the power amplifier, matching circuit is designed according to the load impedances above for the 4×50 μm GaN transistors at respective frequency points in step 109. Upon completion of the design, based on the quasi-physical statistical model proposed by Z Wen, S Mao, Y Wu, R Xu, B Yan, and Y Xu in their article "A Quasi-Physical Large-Signal Statistical Model for 0.15 μm AlGaN/GaN HEMTs Process," 2019 IEEE MTT-S International Microwave Symposium (IMS), Boston, Mass., USA, 2019, pp. 208-211", a simulation is conducted to obtain large-signal output characteristics within a frequency band 32-38 GHz. Output characteristic thresholds are set according to Table 4.

TABLE 4

| Output Characteristic Thresholds | | | |
|---|---|---|---|
| MinPout | MinGain | MaxGain | MinPAE |
| 42 dBm | 16.1 dB | 17.9 dB | 25% |

Figure 10:
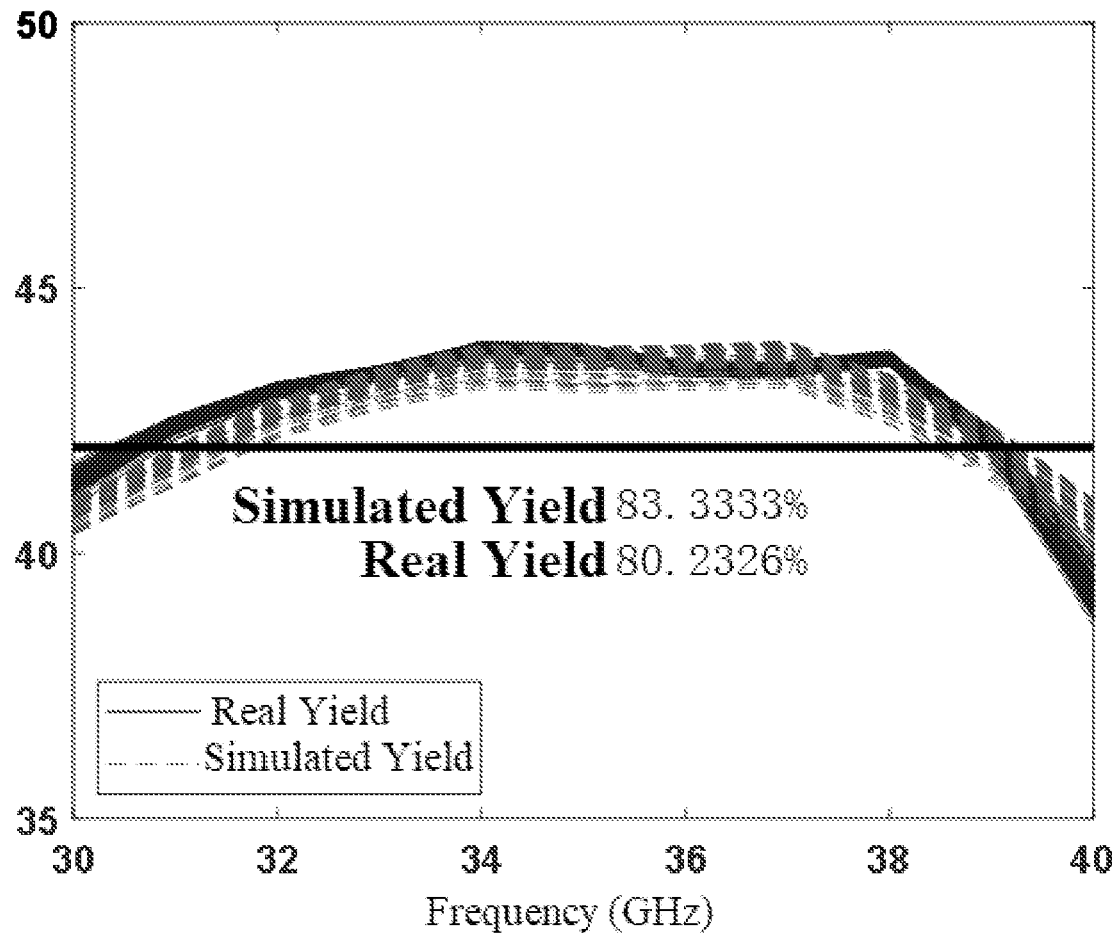
FIG. 10 illustrates a simulated yield result according to an embodiment of the present disclosure.

As can be seen from the simulation results in FIG. 10, the simulated yield is 83.3%, which is substantially close to the real yield: 80.2%. Furthermore, the simulated yield is close to the lowest yield 84% of a single device within the frequency band as shown in Table 3. These results prove that the yield load pull system-based MMIC design method according to the present disclosure is effective.

The present disclosure enables full utilization of the fabrication process without changing the existing device layout, optimizes the yield while ensuring output characteristics, reduces design cost, reduces the arbitrariness in circuit tuning and optimization and provides a scientific and intuitive guidance for improving the yield in circuit design.

Figure 11:
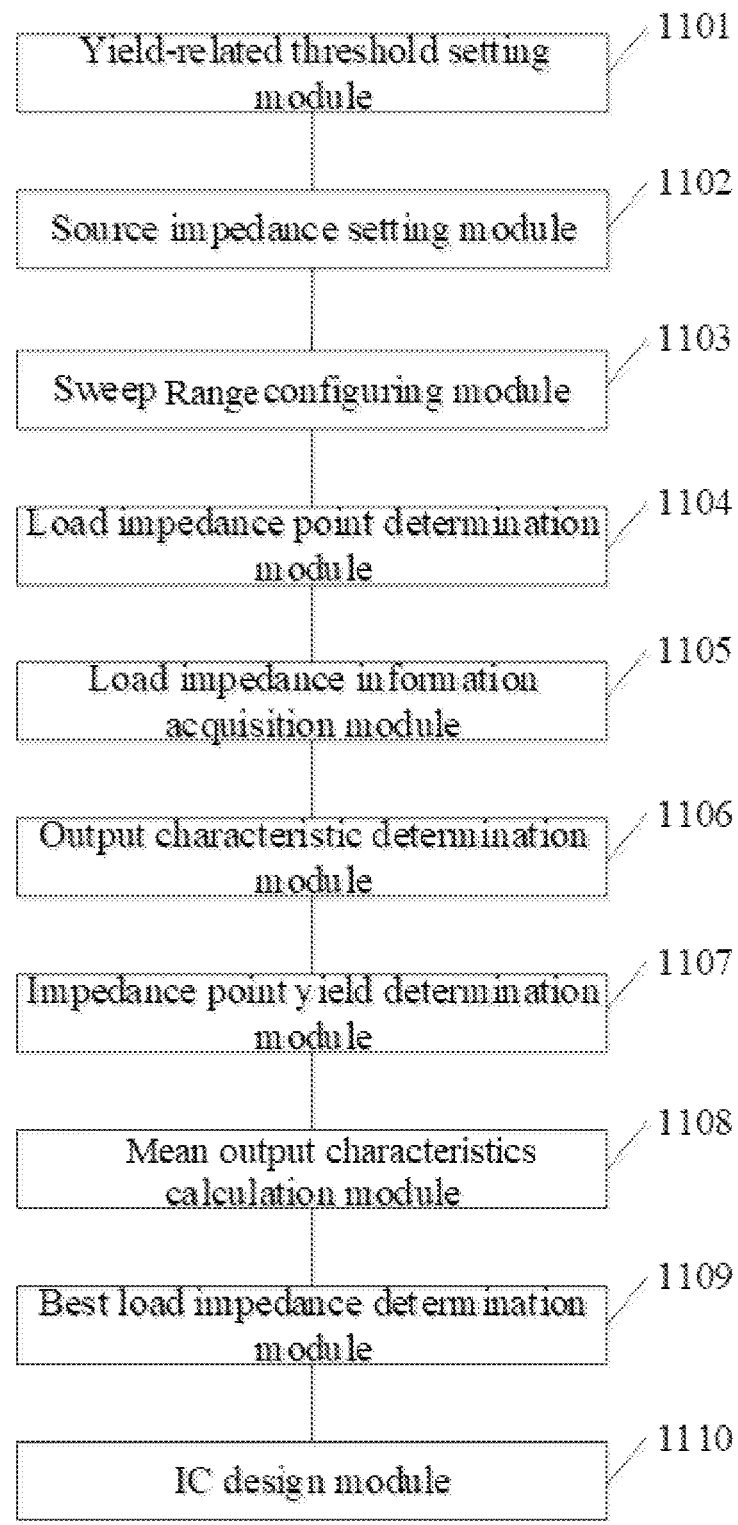
FIG. 11 is a schematic diagram of a yield load pull system-based IC design system according to an embodiment of the present disclosure.

A second aspect of the present disclosure provides a yield load pull system-based IC design system. As shown in FIG. 11, the system includes:

a yield-related threshold setting module 1101, configured to set a yield-related threshold, the yield-related threshold comprising a large-signal gain threshold, an output power threshold and a power-added efficiency threshold;

a source impedance setting module 1102, configured to set a source impedance;

a sweep range configuring module 1103, configured to configure a Smith chart sweep range corresponding to load impedance;

a load impedance point determination module 1104, configured to determine load impedance points within the Smith chart sweep range;

a load impedance information acquisition module 1105, configured to acquire impedance information corresponding to each load impedance point;

an output characteristic determination module 1106, configured to determine output characteristics of a plurality of sample devices at each load impedance point, based on the source impedance and the impedance information corresponding to each load impedance point, by invoking a harmonic balance simulator embedded in ADS, where the output characteristics comprise: large-signal gain, output power and power-added efficiency;

an impedance point yield determination module 1107, configured to determine a device yield for each load impedance point, according to a criterion that considers sample devices whose output characteristics meet the yield-related threshold passing;

a mean output characteristic calculation module 1108, configured to calculate, for each output characteristic, a mean across the plurality of sample devices, at each load impedance point;

a best load impedance determination module 1109, configured to determine a best load impedance according to the device yields of respective load impedance points and the mean output characteristic at respective load impedance points;

an IC design and fabrication module 1110, configured to conduct IC design and fabrication according to the best load impedance.

In an embodiment, the output characteristic determination module 1106 may include:

a simulation unit, configured to input the source impedance and the impedance information corresponding to each load impedance point and specified simulation conditions to a harmonic balance simulator embedded in ADS, to obtain RF current and voltage of each sample device at a fundamental frequency at each load impedance point;

an output characteristic calculation unit, configured to calculate output characteristics of the sample device at each load impedance point according to the RF current and voltage.

In an embodiment, the best load impedance determination module 1109 may include:

a yield-impedance characteristic contours determination unit, configured to correlate the yield at each load impedance point with the position of the load impedance point in the Smith chart, and acquire yield-impedance characteristic contours;

a mean output power impedance characteristic contours determination unit, configured to correlate mean output power at each load impedance point with the position of the load impedance point in the Smith chart, and acquire mean output power impedance characteristic contours;

a mean power-added efficiency impedance characteristic contours determination unit, configured to correlate mean power-added efficiency at each load impedance point with the position of the load impedance point in the Smith chart, and acquire mean power-added efficiency impedance characteristic contours;

a best load impedance determination unit, configured to determine a best load impedance, according to the yield-impedance characteristic contours, the mean power-added efficiency impedance characteristic contours and the mean power-added efficiency impedance characteristic contours.

Various embodiments are described in this specification in a progressive manner, with the emphasis of each embodiment on an aspect difference from other embodiments. Hence, reference can be made to these similar parts between the embodiments. The system embodiments of the present disclosure correspond to the method embodiments, and thus are described in a simple manner; please refer to the method embodiments for details.

While the principles and embodiments of the present disclosure have been described herein with specific examples, the foregoing description of the embodiments is provided only to aid in the understanding of the concept of the disclosed embodiments of the present invention. Those skilled in that art can make modifications to the embodiments and applications described herein based on the concept of the present invention. In view of the above, the specification shall not be construed as limiting the scope of the present invention.

The invention claimed is:

1. A yield load pull system-based integrated circuit (IC) design method, comprising:
    setting a yield-related threshold, the yield-related threshold comprising a large-signal gain threshold, an output power threshold and a power-added efficiency threshold;
    setting a source impedance;
    configuring a sweep range of a Smith chart corresponding to a load impedance;
    determining load impedance points within the sweep range of the Smith chart;
    acquiring impedance information corresponding to each load impedance point of the determined load impedance points;
    determining output characteristics of a plurality of sample devices at said each load impedance point, based on the source impedance and the impedance information corresponding to each said load impedance point, by invoking a harmonic balance simulator embedded in an Advanced Design System (ADS), where the output characteristics comprise: a large-signal gain, an output power and a power-added efficiency;
    determining a device yield for said each load impedance point, according to a criterion that sample devices whose output characteristics meet the yield-related threshold is passing;
    calculating, for each output characteristic, a mean value across the plurality of sample devices, at said each load impedance point;
    determining a best load impedance according to the device yields of the load impedance points and the mean output characteristics at the load impedance points; and
    conducting the IC design according to the best load impedance.

2. The yield load pull system-based IC design method according to claim 1, wherein the large-signal gain threshold is a range [MinGain, MaxGain] where MaxGain is a maximum gain threshold and MinGain is a minimum gain threshold.

3. The yield load pull system-based IC design method according to claim 1, wherein the output power threshold is a minimum output power threshold.

4. The yield load pull system-based IC design method according to claim 1, wherein the power-added efficiency threshold is a minimum power-added efficiency threshold.

5. The yield load pull system-based IC design method according to claim 1, wherein the determining the output characteristics of a plurality of sample devices at said each load impedance point based on the source impedance and the impedance information corresponding to said each load impedance point by invoking a harmonic balance simulator embedded in the ADS comprises:
    inputting the source impedance and the impedance information corresponding to said each load impedance point to the harmonic balance simulator embedded in the ADS, to obtain an RF current and an RF voltage of each sample device at a fundamental frequency at said each load impedance point; and
    calculating an output characteristics of said each sample device at said each load impedance point according to the RF current and the RF voltage.

6. The yield load pull system-based IC design method according to claim 1, wherein the determining the device yield for said each load impedance point according to the criterion that sample devices whose output characteristics meet the yield-related threshold is passing comprises:
    determining, the sample devices of the plurality of sample devices, that meet all of the large-signal gain threshold, the output power threshold and the power-added efficiency threshold are passing;
    calculating a number of passing sample devices at said each load impedance point; and
    calculating a device yield for said each load impedance point according to the number of passing sample devices at said each load impedance point.

7. The yield load pull system-based IC design method according to claim 1, wherein the determining the best load impedance according to the device yields of the respective load impedance points and the mean output characteristics at the respective load impedance points comprises:

correlating the device yield at said each load impedance point with the position of said each load impedance point in the Smith chart, and acquiring yield-impedance characteristic contours;

correlating mean output power at said each load impedance point with the position of said each load impedance point in the Smith chart, and acquiring mean output power impedance characteristic contours;

correlating mean power-added efficiency at said each load impedance point with the position of said each load impedance point in the Smith chart, and acquiring mean power-added efficiency impedance characteristic contours; and determining the best load impedance, according to the yield-impedance characteristic contours, the mean output power impedance characteristic contours and the mean power-added efficiency impedance characteristic contours.

8. A yield load pull system-based integrated circuit (IC) design system, comprising:

a yield-related threshold setting module, configured to set a yield-related threshold, the yield-related threshold comprising a large-signal gain threshold, an output power threshold and a power-added efficiency threshold;

a source impedance setting module, configured to set a source impedance;

a sweep range configuring module, configured to configure a sweet range of a Smith chart corresponding to a load impedance;

a load impedance point determination module, configured to determine load impedance points within the sweep range of the Smith chart;

a load impedance information acquisition module, configured to acquire impedance information corresponding to each load impedance point of the determined load impedance points;

an output characteristic determination module, configured to determine output characteristics of a plurality of sample devices at said each load impedance point, based on the source impedance and the impedance information corresponding to each load impedance point, by invoking a harmonic balance simulator embedded in an Advanced Design System (ADS), where the output characteristics comprise: a large-signal gain, an output power and a power-added efficiency;

an impedance point yield determination module, configured to determine a device yield for said each load impedance point, according to a criterion that sample devices whose output characteristics meet the yield-related threshold is passing;

a mean output characteristic calculation module, configured to calculate, for each output characteristic, a mean value across the plurality of sample devices, at said each load impedance point;

a best load impedance determination module, configured to determine a best load impedance according to the device yields of the respective load impedance points and the mean output characteristics at the respective load impedance points; and an IC design module, configured to conduct the IC design according to the best load impedance.

9. The yield load pull system-based IC design system according to claim 8, wherein the output characteristic determination module comprises:

a simulation unit, configured to input the source impedance and the impedance information corresponding to said each load impedance point and specified simulation conditions to the harmonic balance simulator embedded in the ADS, to obtain an RF current and an RF voltage of each sample device at a fundamental frequency at said each load impedance point; and an output characteristic calculation unit, configured to calculate an output characteristics of said each sample device at said each load impedance point according to the RF current and the RF voltage.

10. The yield load pull system-based IC design system according to claim 8, wherein the best load impedance determination module comprises:

a yield-impedance characteristic contours determination unit, configured to correlate the device yield at said each load impedance point with the position of said each load impedance point in the Smith chart, and acquire yield-impedance characteristic contours;

a mean output power impedance characteristic contours determination unit, configured to correlate mean output power at said each load impedance point with the position of said each load impedance point in the Smith chart, and acquire mean output power impedance characteristic contours;

a mean power-added efficiency impedance characteristic contours determination unit, configured to correlate mean power-added efficiency at said each load impedance point with the position of said each load impedance point in the Smith chart, and acquire mean power-added efficiency impedance characteristic contours; and a best load impedance determination unit, configured to determine the best load impedance, according to the yield-impedance characteristic contours, the mean power-added efficiency impedance characteristic contours and the mean power-added efficiency impedance characteristic contours.

* * * * *